US008730400B2

(12) United States Patent
Kim (10) Patent No.: US 8,730,400 B2
(45) Date of Patent: May 20, 2014

(54) IMAGE DISPLAYING APPARATUS AND IMAGE PROCESSING APPARATUS (75) Inventor: Hae-Ryong Kim, Gumi (KR)

(73) Assignee: LG Electronics Inc., Seoul (KR)

( * ) Notice: Subject to any disclaimer, the term of this patent is extended or adjusted under 35 U.S.C. 154(b) by 717 days.

(21) Appl. No.: 12/506,329

(22) Filed: Jul. 21, 2009

(65) Prior Publication Data

US 2010/0020245 A1 Jan. 28, 2010

(30) Foreign Application Priority Data

Jul. 22, 2008 (KR) ........................ 10-2008-0071143

(51) Int. Cl.
H04N 5/268 (2006.01)

(52) U.S. Cl.
USPC ........... 348/706; 348/705; 348/704; 348/725; 348/729; 348/608; 348/553; 348/554; 348/555; 348/556; 348/557; 348/558; 348/569; 348/607; 348/448; 345/156; 345/611; 345/629; 345/38; 345/87; 725/151; 715/810; 370/394; 370/311; 370/389

(58) Field of Classification Search
USPC ......... 348/706, 704, 569, 607, 725, 729, 608, 348/553–558, 705; 345/156, 611, 629, 38, 345/87; 725/151; 715/810; 370/394, 311, 370/389

See application file for complete search history.

(56) References Cited

U.S. PATENT DOCUMENTS

| 4,782,297 | A  | * | 11/1988 | Schmalbein et al. | ......... 324/316 |
|---|---|---|---|---|---|
| 6,305,021 | B1 | * | 10/2001 | Kim | ............................... 725/131 |
| 6,466,264 | B1 | * | 10/2002 | Shioji | ........................ 348/231.4 |
| 8,014,470 | B2 | * | 9/2011 | Lee et al. | ....................... 375/340 |
| 2003/0011689 | A1 | * | 1/2003 | Shioji | ........................ 348/231.6 |
| 2003/0210208 | A1 | * | 11/2003 | Pu et al. | .......................... 345/1.1 |
| 2005/0259181 | A1 | * | 11/2005 | Watanabe | ..................... 348/554 |
| 2005/0259948 | A1 | * | 11/2005 | Ando | .............................. 386/46 |
| 2005/0285832 | A1 | * | 12/2005 | Shin et al. | ........................ 345/87 |
| 2007/0040722 | A1 | * | 2/2007 | Kim | ............................... 341/155 |
| 2007/0046815 | A1 | * | 3/2007 | Lee | ................................ 348/553 |
| 2007/0085933 | A1 | * | 4/2007 | Takagi et al. | .................. 348/729 |
| 2007/0110105 | A1 | * | 5/2007 | Usuki et al. | ................... 370/487 |
| 2007/0285349 | A1 | * | 12/2007 | Hong et al. | ...................... 345/38 |
| 2008/0063103 | A1 | * | 3/2008 | Lee et al. | ....................... 375/262 |
| 2008/0155466 | A1 | * | 6/2008 | Lee | ................................ 715/810 |
| 2008/0301752 | A1 | * | 12/2008 | Jung | ............................. 725/151 |
| 2009/0304069 | A1 | * | 12/2009 | Hoffert et al. | ............. 375/240.01 |

* cited by examiner

Primary Examiner — Jefferey Harold
Assistant Examiner — Mustafizur Rahman
(74) Attorney, Agent, or Firm — Ked & Associates, LLP (57) ABSTRACT An image displaying apparatus and an image processing apparatus are provided. The image displaying apparatus comprises a signal receiver unit, a signal processor unit, a display unit, a signal output unit, and a control unit. The signal receiver unit receives a broadcast signal or a signal provided from a signal source. The signal processor unit processes the received signal. The display unit displays the processed signal. The signal output unit comprises an output terminal configured to output the received signal, and a signal converter configured to convert the processed signal. The control unit controls the signal, provided from the signal receiver unit, to be outputted to the external device by using the signal output unit.

9 Claims, 6 Drawing Sheets fig.1 fig.2 fig.3 fig.4 fig.5 fig.6 fig.7 fig.8

IMAGE DISPLAYING APPARATUS AND IMAGE PROCESSING APPARATUS

CROSS-REFERENCE TO RELATED APPLICATIONS

The present application claims priority under 35 U.S.C. 119 and 35 U.S.C. 365 to Korean Patent Application No. 10-2008-0071143 (filed on Jul. 22, 2008), which is hereby incorporated by reference in its entirety.

BACKGROUND

The present disclosure relates to an image displaying apparatus, and more particularly, to a method for outputting a signal, which is received by an image displaying apparatus, through an external output terminal.

In general, an image displaying apparatus processes video signals from a signal source to display images to users.

To this end, the image displaying apparatus includes a video signal processor unit for processing an input video signal, a scaler unit for converting the video signal received from the video signal processor unit into a displayable format, a display unit for displaying the converted video signal, and a control unit for controlling the above units.

Also, a related art image displaying apparatus has an external output terminal for outputting a received video signal to another monitor or image displaying apparatus.

A tuner of the image displaying apparatus divides cable or antenna signals by digital and analog channels prior to output. In the case of the digital channel, an IF signal is outputted and inputted to a main IC. In the case of the analog channel, a CVBS (Composite Video Baseband Signal) is outputted and inputted to a video signal processor.

In addition, as external input signals, CVBS-type AV terminal and high-resolution analog signals PC RGB and component or digital HDMI (High Definition Multimedia Interface) signals are inputted through an external input terminal to the image displaying apparatus.

The inputted signals are image-processed, are scaled by a scaler, are converted into digital signals of LVDS (Low Voltage Differential Signaling) format, and are displayed by an LCD or PDP module.

Herein, the resolution of the outputted LVDS signal is equal to the resolution of the LCD or PDP module. In general, the resolution is 1366×768p in the case of an HD module and the resolution is 1920×1080p in the case of a full-HD module.

Meanwhile, the related art image displaying apparatus uses an external output terminal to output a displayed image to another image displaying apparatus such as a second image displaying apparatus or a third image displaying apparatus. Herein, an RCA jack or an SCART jack is used for the external output terminal.

This means that the types of signals, which can be outputted from the image displaying apparatus to an external device, are limited. That is, only signals inputted through some of the input terminals of the image displaying apparatus can be outputted to an external image displaying apparatus (e.g., a monitor).

That is, among the input terminals of the image displaying apparatus, only a CVBS input analog RF signal and an AV terminal signal are outputted as CVBS-type signals through the external output terminal, and signals inputted through RF DTV, PC RGB, COMPONENT and HDMI terminals are not outputted to an external device, causing much restriction of use.

In the result, a separate divider or an additional signal cable must be prepared and connected in order to output the signals inputted through the RF DTV, PC RGB, COMPONENT and HDMI terminals to another image displaying apparatus.

Due to the above limitation, the user of an image displaying apparatus and an external monitor suffers much inconvenience related to the signal input/output.

SUMMARY

Embodiments provide an image displaying apparatus capable of outputting various input signals to an external video device.

In one embodiment, an image displaying apparatus comprises: a signal receiver unit receiving a broadcast signal or a signal provided from a signal source; a signal processor unit processing the received signal; a display unit displaying the processed signal; a signal output unit comprising an output terminal configured to output the received signal to an external device, and a signal converter configured to convert the processed signal; and a control unit controlling the signal, provided from the signal receiver unit, to be outputted through the signal output unit to the external device.

In another embodiment, an image displaying apparatus comprises: a signal receiver unit comprising an HDMI (High Definition Multimedia Interface) terminal configured to receive a signal provided from a signal source, and a tuner configured to receive a broadcast signal; a signal processor unit processing the received signal; a display unit displaying the processed signal; a signal output unit comprising an output terminal configured to output the signal received by the HDMI terminal; and a control unit controlling the signal, provided from the HDMI terminal, to be displayed through the display unit or to be outputted through the signal output unit to an external device, wherein the signal output unit comprises a signal converter converting the signal format of the signal processed by the signal processor unit.

In further another embodiment, an image processing apparatus comprises: a signal receiver unit receiving a broadcast signal or a signal provided from a signal source; a signal processor unit processing the received signal; a signal output unit comprising an output terminal configured to output the signal received by the signal receiver unit to an external device, and a signal converter configured to convert the processed signal; and a control unit controlling the signal, provided through the signal receiver unit, to be outputted through the signal output unit to the external device.

The details of one or more embodiments are set forth in the accompanying drawings and the description below. Other features will be apparent from the description and drawings, and from the claims.

DETAILED DESCRIPTION OF THE EMBODIMENTS

Hereinafter, the embodiments of the present disclosure will be described in detail with reference to the accompanying drawings.

The invention may, however, be embodied in many different forms and should not be construed as being limited to the embodiments set forth herein; rather, that alternate embodiments included in other retrogressive inventions or falling within the spirit and scope of the present disclosure can easily be derived through adding, altering, and changing, and will fully convey the concept of the invention to those skilled in the art.

The meaning of "include," "comprise," "including," or "comprising," specifies an element or a component but does not exclude other elements or components.

Figure 1:
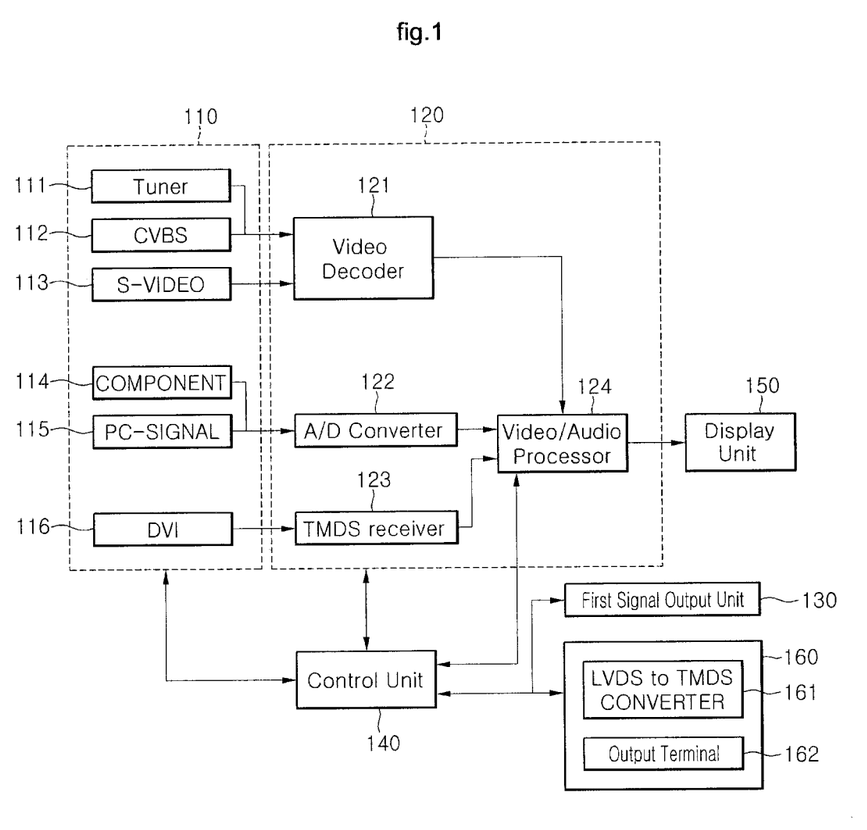
FIG. 1 is a block diagram of an image displaying apparatus according to an embodiment 1.

FIG. 1 is a block diagram of an image displaying apparatus according to an embodiment 1.

Referring to FIG. 1, an image displaying apparatus according to an embodiment 1 includes: a signal receiver unit 110 for receiving a broadcast signal and a signal from an external source; a signal processor unit 120 for processing the received signals; a display unit 150 for displaying the processed signals; signal output units 130 and 160 for outputting signals through an external output terminal 162 to an external device with respect to the signals received through the signal receiver unit 110; and a control unit 140 for controlling the above units.

The signal receiver unit 110 may include: a tuner 111 for tuning a broadcast signal of a specific channel selected by a user; and an AV terminal 112, an S-Video terminal 113, a COMPONENT terminal 114, a PC-Signal terminal 115 and a DVI (Digital Video Interactive) terminal 116 for receiving signals of CVBS (Composite Video Baseband Signal) format to receive video signals corresponding to various external sources.

For reference, an embodiment 1 discloses the case of forming a DVI terminal for a receiver unit of a video signal corresponding to an external source, and an embodiment 2 discloses the case of forming an HDMI terminal. While the embodiment 2 discloses the configuration of bypassing a signal inputted through the HDMI terminal, it may perform an operation by the embodiment 1 disclosing a signal inputted through the HDMI terminal besides the DVI terminal.

The signal processor unit 120 converts a signal inputted through the signal receiver unit 110 into a format processable by the display unit 150. The signal processor unit 120 includes: a video decoder 121 for decoding an encoded signal; an A/D converter 122 for converting an analog signal into a digital signal; a TMDS (Transition Minimized Differential Signaling) receiver 123; and a video/audio processor 124 for processing video/audio signals contained in a processed signal into a format displayable on a screen.

The image displaying apparatus may further include a scaler (not illustrated) for converting a video signal image-processed by the signal processor unit 120 in accordance with vertical frequency, resolution and aspect ratio according to the output standard of the display unit 150.

The signal output units 130 and 160 output video signals, which are received through the signal receiver unit 110, to an external image displaying apparatus. The signal output units include: a first signal output unit 130 for outputting an analog RF signal, which is inputted in a CVBS format, or a signal, which is inputted through an AV terminal, to an external device; and a second signal output unit 160 for outputting signals, which are inputted through RF DTV, PC RGB, COMPONENT, DVI and HDMI terminals (not illustrated), to an external device.

The first signal output unit 130 includes an RCA (PHONE) jack or an SCART jack. If a signal received through the signal receiver unit 110 is a CVBS signal, video/audio signals are outputted through the first signal output unit 130 to an external device.

With respect to a signal received through the signal receiver unit 110 according to an embodiment, the processing routine varies depending on the signal types. If a signal received through the signal receiver unit 110 is formatted into an LVDS signal by the video/audio processor 124 and the scaler, it is converted by the second signal output unit 160 prior to output to an external device. Herein, the signal outputted through the second signal output unit 160 to an external device is a signal inputted through the COMPONENT terminal 114, the PC-RGB signal terminal 115, the DVI terminal 116 or the HDMI terminal.

The second signal output unit 160 includes a DVI output terminal 162 and a signal converter 161 for converting a signal-processed LVDS digital signal into a TMDS digital signal.

Because the second signal output unit 160 outputs a video signal through the DVI output terminal 162, the control unit 140 controls an audio signal, among the signals received through the signal receiver unit 110, to be outputted through an analog L/R terminal of the first signal output unit 130.

In the result, a high-quality signal (not a CVBS-type signal) among the signals received through the signal receiver unit 110 is converted by the second signal output unit 160 prior to output, and an audio signal is outputted through the first signal output unit 130.

Although FIG. 1 illustrates that the signal receiver unit 110, the signal processor unit 120, the signal output units 130 and 160, the control unit 140, and the display unit 150 are included in one image displaying apparatus, the present invention is not limited thereto. For example, the above units may be included two or more separate devices.

For example, the image displaying apparatus may include the signal receiver unit 110, the signal processor unit 120, the signal output units 130 and 160, and the control unit 140; and the display unit 150 may be included in a display device external to the image displaying apparatus.

The image displaying apparatus, including the signal receiver unit 110, the signal processor unit 120, the signal output units 130 and 160, and the control unit 140, transmits a signal received by the signal receiver unit 110 and processed by the signal processor unit 120 to the external display device including the display unit 150, so that the external display device can display the received signal (e.g., a video signal) by means of the display unit 150.

The image displaying apparatus according to the embodiment may communicate signals with the external display device through wireless communication. For example, the image displaying apparatus may transmit the signal processed by the signal processor unit 120 to the external display device through a wireless communication scheme such as Wi-HD or Wi-Fi.

The configuration for converting an LVDS signal into a TMDS signal in order to output a TMDS signal through the DVI terminal of the second signal output unit 160 will be described below with reference to FIGS. 2 to 5.

Figure 2:
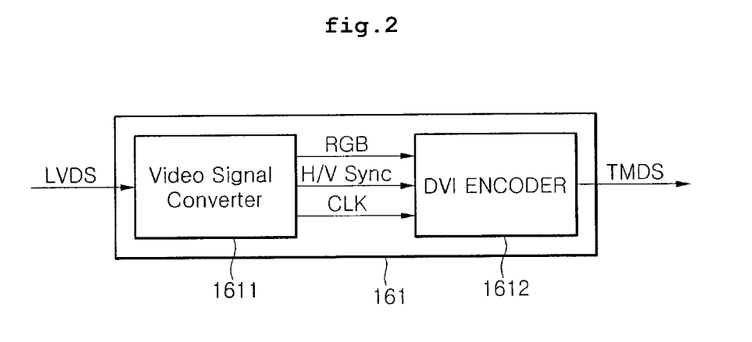
FIG. 2 is a block diagram of a signal converter according to an embodiment 1.
Figure 3:
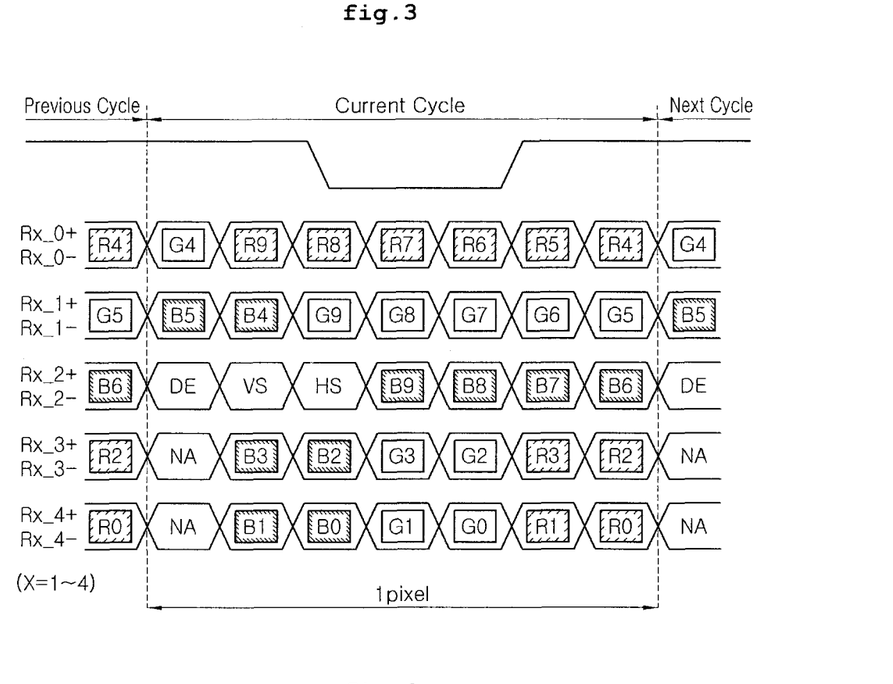
FIG. 3 is a diagram illustrating an LVDS signal of JEIDA format.
Figure 4:
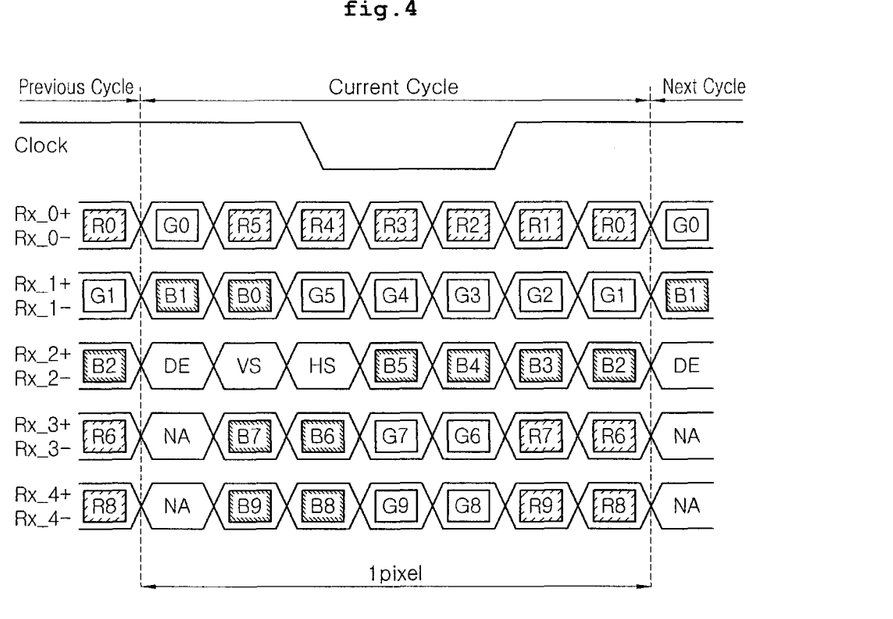
FIG. 4 is a diagram illustrating an LVDS signal of NS format.

FIG. 2 is a block diagram of a signal converter according to an embodiment 1. FIG. 3 is a diagram illustrating an LVDS signal of JEIDA format. FIG. 4 is a diagram illustrating an LVDS signal of NS format.

FIG. 2 illustrates a block diagram of the signal converter 161 included in the second signal output unit 160. If the external source provides a high-quality image to the image displaying apparatus as described above, the signal converter 161 converts a video signal so that the high-quality image can be outputted through the output terminal.

The signal converter 161 includes: a video signal converter 1611 for converting an LVDS digital signal image-processed and format-converted by the video processor 124 and the scaler into a TMDS digital signal and outputting an RGB signal from an inputted LVDS signal; and a DVI encoder 1612 for encoding the signals outputted through the video signal converter 1611 into TMDS signals.

The video signal converter 1611 receives a JEIDA-format LVDS signal or an NS-format LVDS signal as illustrated in FIGS. 3 and 4, reads RGB digital signals RED[7:0], GRN[7:0] and BLU{7:0} among the signals contained in the received signal, and outputs the read signals together with HSYNC, VSYNC and CLOCK signals.

Figure 5:
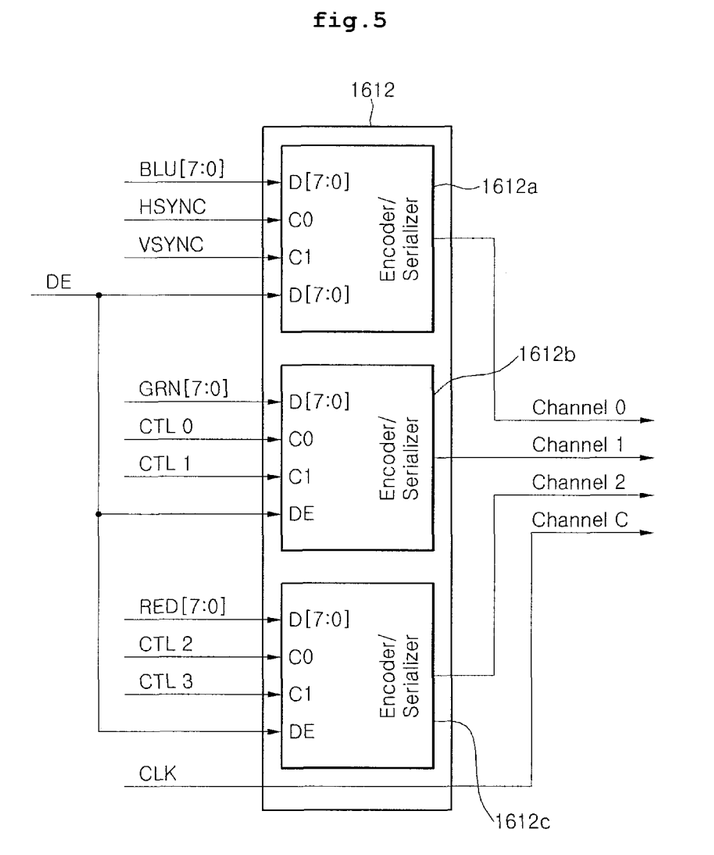
FIG. 5 is a block diagram of a DVI encoder according to an embodiment 1.

The signals outputted through the video signal converter 1611 are encoded by the DVI encoder 1612, the detailed configuration of which is illustrated in FIG. 5.

FIG. 5 is a block diagram of the DVI encoder 1612 according to an embodiment 1.

Referring to FIG. 5, the DVI encoder 1612 includes a first encoding logic 1612a, a second encoding logic 1612b, and a third encoding logic 1612c.

The first encoding logic 1612a encodes streams to be transmitted through a first TMDS channel (channel 0) and serializes the encoded bits. That is, the first encoding logic 1612a selectively encodes a pixel component (D7-D0) and a horizontal/vertical sync (C0-C1) in response to a data enable signal. Herein, the pixel component is a Blue component.

The second encoding logic 1612b encodes streams to be transmitted through a second TMDS channel (channel 1) and serializes the encoded bits. That is, the second encoding logic 1612b selectively encodes a pixel component (D7-D0) and a CTL0/CTL1 (C0-C1) in response to a data enable signal. Herein, the pixel component is a Green component.

The third encoding logic 1612c encodes streams to be transmitted through a third TMDS channel (channel 2) and serializes the encoded bits. That is, the third encoding logic 1612c selectively encodes a pixel component (D7-D0) and a CTL2/CTL3 (C0-C1) in response to a data enable signal. Herein, the pixel component is a Red component.

Thereafter, the video signal converted into a TMDS format by the DVI encoder 1612 is outputted to the external image displaying apparatus connected through the output terminal 162.

Accordingly, the output to the external monitor is possible even if a high-quality image is provided by the external source to the image displaying apparatus.

Figure 6:
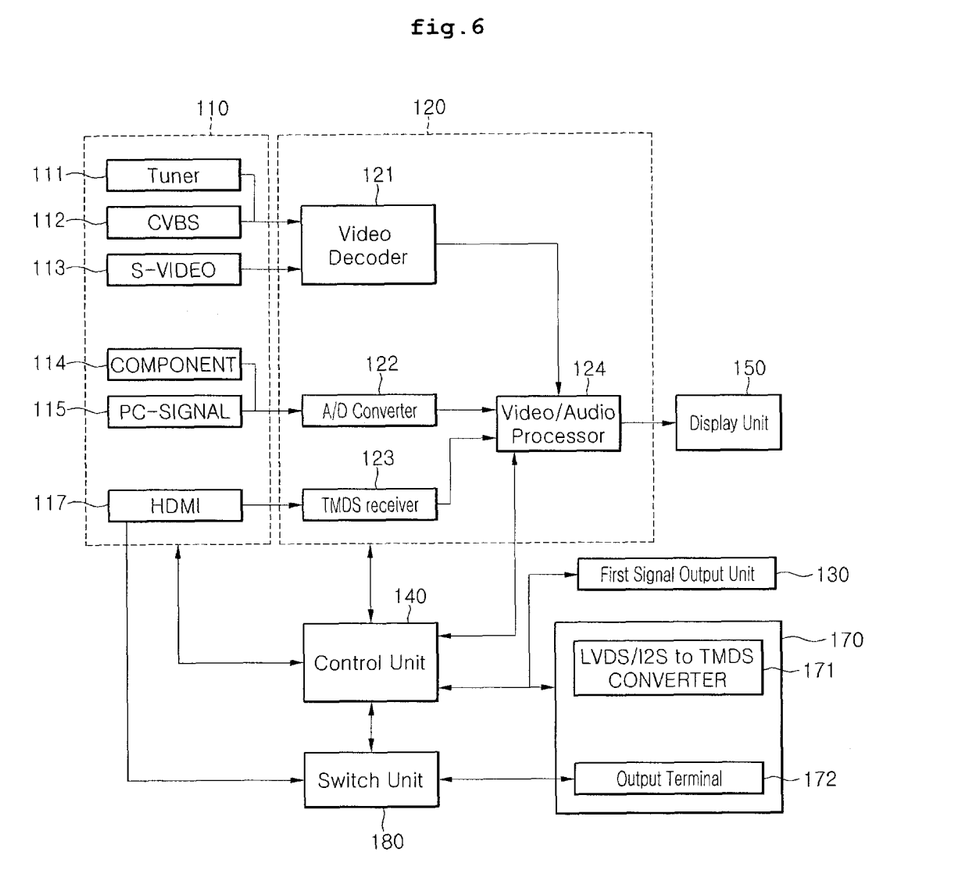
FIG. 6 is a block diagram of an image displaying apparatus according to an embodiment 2.

FIG. 6 is a block diagram of an image displaying apparatus according to an embodiment 2.

FIG. 5 illustrates a DVI terminal as an external source input terminal, and FIG. 6 illustrates an HDMI terminal instead of the DVI terminal. However, according to a modified embodiment, the HDMI terminal may also be provided in the image displaying apparatus of the embodiment 1. In this case, the video signal provided through the HDMI terminal according to the embodiment 1 may be outputted through the second signal output unit.

Herein, the image displaying apparatus according to the embodiment 2 of FIG. 6 switches video/audio signals provided through an HDMI terminal 117, so that it is outputted to an external device through an output terminal 172 of a second signal output unit 170.

Like reference numerals denotes like elements in the embodiments 1 and 2, and thus their description will be omitted for conciseness.

Referring to FIG. 6, an image displaying apparatus according to an embodiment 2 includes: a signal receiver unit 110 for receiving a broadcast signal and a signal from an external source; a signal processor unit 120 for processing the received signals; a display unit 150 for displaying the processed signals; signal output units 130 and 170 for outputting signals through the external output terminal 172 to an external device with respect to the signals received through the signal receiver unit 110; and a control unit 140 for controlling the above units.

The signal receiver unit 110 may include: a tuner 111 for tuning a broadcast signal of a specific channel selected by a user; and an AV terminal 112, an S-Video terminal 113, a COMPONENT terminal 114, a PC-Signal terminal 115 and an HDMI (High Definition Multimedia Interface) terminal 117 for receiving signals of CVBS (Composite Video Baseband Signal) format to receive video signals corresponding to various external sources.

The signal output units 130 and 170 output video signals, which are received through the signal receiver unit 110, to an external image displaying apparatus. The signal output units include: a first signal output unit 130 for outputting an analog RF signal, which is inputted in a CVBS format, or a signal, which is inputted through an AV terminal, to an external device; and a second signal output unit 170 for outputting signals, which are inputted through RF DTV, PC RGB, COMPONENT and HDMI terminals, to an external device.

If a signal received through the signal receiver unit 110 is formatted into an LVDS signal by the signal processor unit 120, it is converted by the second signal output unit 170 prior to output to an external device. Herein, the signal outputted through the second signal output unit 170 to an external device is a signal inputted through the COMPONENT terminal 114, the PC-RGB signal terminal 115 or the HDMI terminal 117.

According to the image displaying apparatus according to the embodiment 2, a digital video signal outputted in an LVDS format by the signal processor unit 120 and a signal generated by multiplexing a digital audio signal of a digital I2S format are converted into TMDS signals prior to output through the HDMI output terminal 172.

That is, the control unit 140 performs a control operation for multiplexing a digital video signal converted into a LVDS format by the video processor and the scaler and a digital audio signal converted into an I2S format by the audio processor and outputting the resulting signal through the HDMI output terminal 172 of the second signal output unit 170.

Thus, a video signal and an audio signal are included in the signal outputted through the second signal output unit 170.

The conversion of an I2S signal into an L/R signal and the conversion of an LVDS signal into a TMDS signal by the second signal output unit 170 will be described later with reference to FIGS. 7 and 8.

Meanwhile, the control unit 140 may perform a control operation for selectively bypassing a TMDS signal provided through the HDMI terminal 117 and outputting the same through the HDMI output terminal 172.

That is, the control unit 140 performs a control operation for selectively switching video/audio signals inputted through the HDMI terminal 117 and outputting the same through a signal converter 171 and the output terminal 172 of the second signal output unit 170.

To this end, the control unit 140 controls a switch unit 180 for bypassing a signal provided through the HDMI terminal 117. In this case, the signal is outputted through the output terminal 172 to an external device by bypassing the signal converter 171. The control unit 140 may have a memory buffer to reduce a data loss in bypassing the above signal.

Although FIG. 6 illustrates that the signal receiver unit 110, the signal processor unit 120, the signal output units 130 and 170, the control unit 140, the switch unit 180, and the display unit 150 are included in one image displaying apparatus, the present invention is not limited thereto. For example, the above units may be included two or more separate devices.

For example, the image displaying apparatus may include the signal receiver unit 110, the signal processor unit 120, the signal output units 130 and 170, the control unit 140, and the switch unit 180; and the display unit 150 may be included in a display device external to the image displaying apparatus.

The image displaying apparatus according to the embodiment may communicate signals with the external display device through wireless communication. For example, the image displaying apparatus may transmit the signal processed by the signal processor unit 120 to the external display device through a wireless communication scheme such as Wi-HD or Wi-Fi.

Figure 7:
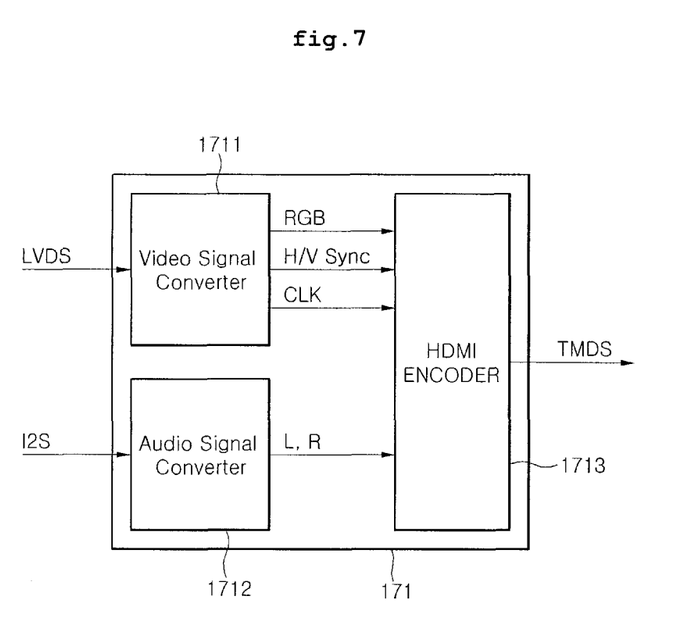
FIG. 7 is a block diagram of a signal converter according to an embodiment 2.

FIG. 7 is a block diagram of a signal converter according to an embodiment 2. FIG. 8 is a block diagram of an HDMI encoder of the signal converter illustrated in FIG. 7.

FIG. 7 illustrates a block diagram of the signal converter 171 included in the second signal output unit 170. If the external source provides the signal to the image displaying apparatus as described above, the signal converter 171 converts a video signal so that the LVDS signal can be outputted through the output terminal.

The signal converter 171 includes: a video signal converter 1711 for converting an LVDS digital signal image-processed and format-converted by the video processor and the scaler into a TMDS digital signal; an audio signal converter 1712 for converting an I2S digital signal processed by the audio processor into an L/R signal for HDMI output; and a HDMI encoder 1713 for encoding the signals outputted through the video signal converter 1711 and the audio signal converter 1712 into TMDS signals.

As described above, the video signal converter 1711 receives a JEIDA-format LVDS signal or an NS-format LVDS signal as illustrated in FIGS. 3 and 4, reads RGB digital signals RED[7:0], GRN[7:0] and BLU{7:0} among the signals contained in the received signal, and outputs the read signals together with HSYNC, VSYNC and CLOCK signals.

Through audio signal processing, the audio signal converter 1712 converts an I2S signal into an L/R signal for HDMI output.

Figure 8:
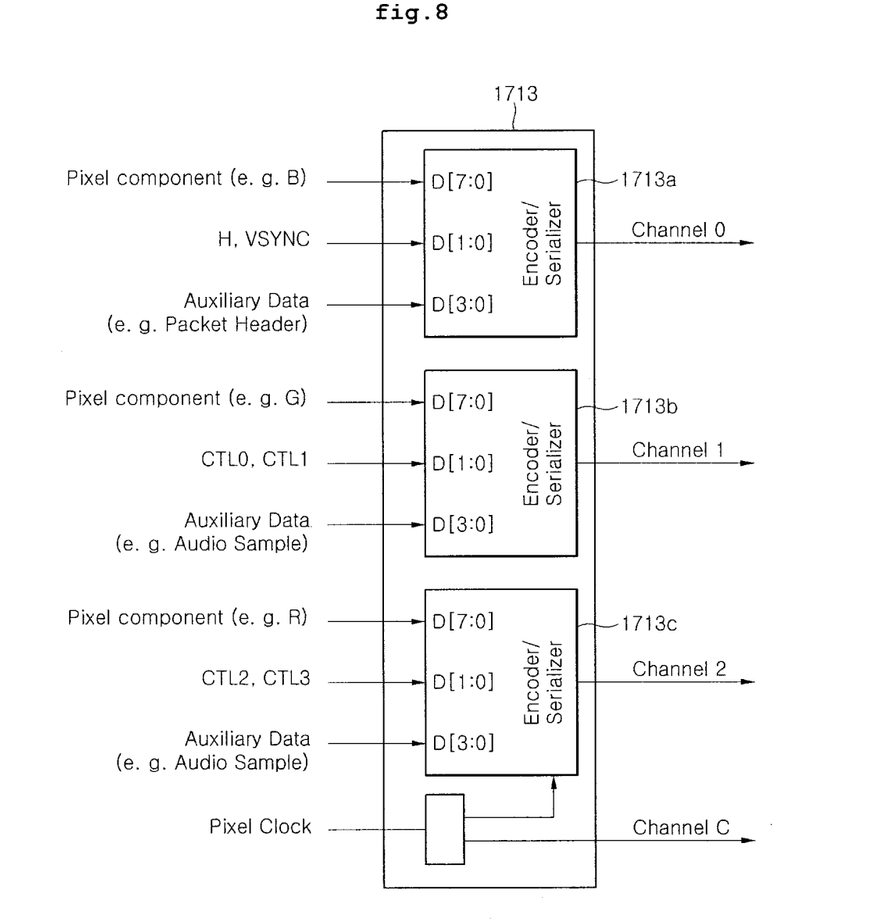
FIG. 8 is a block diagram of an HDMI encoder of the signal converter illustrated in FIG. 7.

The signals, outputted from the video signal converter 1711 and the audio signal converter 1712, are encoded by the HDMI encoder 1713, the detailed configuration of which is illustrated in FIG. 8.

FIG. 8 is a block diagram of the HDMI encoder 1713 according to the embodiment 2.

Referring to FIG. 8, the HDMI encoder 1713 includes a first encoding logic 1713a, a second encoding logic 1713b, and a third encoding logic 1713c.

The first encoding logic 1713a encodes streams to be transmitted through a first TMDS channel (channel 0) and serializes the encoded bits. That is, the first encoding logic 1713a selectively encodes a pixel component (D7-D0) and a horizontal/vertical sync (D1-D0) in response to a data enable signal. Herein, the pixel component is a Blue component and the auxiliary data is a packet header.

The second encoding logic 1713b encodes streams to be transmitted through a second TMDS channel (channel 1) and serializes the encoded bits. That is, the second encoding logic 1713b selectively encodes a pixel component (D7-D0) and a CTL0/CTL1 (D1-D0) in response to a data enable signal. Herein, the pixel component is a Green component and the auxiliary data is an audio sample.

The third encoding logic 1713c encodes streams to be transmitted through a third TMDS channel (channel 2) and serializes the encoded bits. That is, the third encoding logic 1713c selectively encodes a pixel component (D7-D0) and a CTL2/CTL3 (D1-D0) in response to a data enable signal. Herein, the pixel component is a Red component and the auxiliary data is an audio sample.

Thereafter, the video signal converted into a TMDS format by the HDMI encoder 1713 is outputted to the external image displaying apparatus connected through the HDMI output terminal 172.

Thus, the use of the HDMI output terminal makes it possible to implement a bypass configuration that can output video/audio signals through the same output terminal and output a TMDS signal provided through an HDMI input terminal to an external device directly through the output terminal.

As described above, the embodiments can output a high-quality image, inputted to the image displaying apparatus, through the external output terminal, thus making it possible for the user to view a high-quality image through another image displaying apparatus connected to the image displaying apparatus.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An image displaying apparatus comprising:
a display unit;
a signal receiver to receive a signal from at least one signal source;
a signal processor to process the received signal for display through the display unit, wherein the signal processor processes the received signal according to a type of the received signal, wherein the type of the received signal represents one of a low quality type and a high quality type;
a first output unit comprising a first output terminal which outputs a video signal of the low quality type;
a second output unit comprising a second output terminal which outputs a video signal of the high quality type;
a signal converter to convert the signal processed by the signal processor for input to the display unit into a format according to the second output terminal; and
a controller to control the received signal, provided from the signal receiver, to be outputted through at least one of the first or second output units according to the type of the received signal, wherein:

when the received signal from the signal receiver is the video signal of the low quality type, the controller controls the video signal of the low quality type to be input into the first output unit, when the received signal from the signal receiver is the video signal of the high quality type, the controller controls the video signal of the high quality type to be input into the second output unit.

2. The image displaying apparatus according to claim 1, wherein the signal inputted to the display is an LVDS (Low Voltage Differential Signaling) signal.

3. The image displaying apparatus according to claim 1, wherein the controller controls the signal converter to convert an LVDS digital signal into a TMDS (Transition Minimized Differential Signaling) signal.

4. The image displaying apparatus according to claim 1, wherein the first output unit outputs an analog RF signal, which is inputted in a CVBS (Composite Video Baseband Signal) format, or a signal, which is inputted through an AV terminal; and the second output unit outputs a signal, which is inputted through a PC-RGB terminal, a COMPONENT terminal, a DVI (Digital Video Interactive) terminal or an HDMI (High Definition Multimedia Interface) terminal.

5. The image displaying apparatus according to claim 1, wherein the signal converter comprises:

a video signal converter to output an RGB signal from an inputted LVDS signal; and a DVI encoder to encode the signal output from the video signal converter into a TMDS signal.

6. The image displaying apparatus according to claim 1, wherein the signal converter comprises:

a video signal converter converting an LVDS digital signal image-processed and format-converted by the signal processor into a TMDS digital signal;

an audio signal converter converting an I2S digital signal processed by an audio processor of the signal processor into an L/R signal; and an HDMI (High Definition Multimedia Interface) encoder encoding the signals outputted through the video signal converter and the audio signal converter into TMDS signals.

7. The image displaying apparatus according to claim 1, wherein the signal receiver comprises an HDMI input terminal, and the controller performs a control operation for bypassing a signal converter of the second output unit with respect to a video signal provided through the HDMI input terminal and outputting the video signal through the second output terminal of the second output unit.

8. The image displaying apparatus according to claim 1, wherein the signal receiver comprises at least one of an RF DTV terminal, a PC-RGB terminal, a COMPONENT terminal or a DVI terminal for receiving a signal provided from the signal source.

9. The image displaying apparatus according to claim 1, wherein:

the first output unit outputs an audio signal corresponding to the signal received by the signal receiver; and the second output unit outputs a video signal corresponding to the signal received from the signal receiver.

* * * * *